INVENTOR
Howell H. Wellborn

BY Cecil L. Wood

ATTORNEY

July 13, 1965 H. H. WELLBORN 3,193,996
LAWN EDGER AND TRIMMER
Filed July 12, 1963 3 Sheets-Sheet 2

INVENTOR
Howell H. Wellborn

BY

ATTORNEY

INVENTOR
Howell H. Wellborn

BY

ATTORNEY

United States Patent Office 3,193,996
Patented July 13, 1965

3,193,996
LAWN EDGER AND TRIMMER
Howell H. Wellborn, 3911 Highgrove Drive, Dallas, Tex.
Filed July 12, 1963, Ser. No. 294,483
1 Claim. (Cl. 56—25.4)

This invention relates to lawn trimmers and edging tools, and it has particular reference to a power driven lawn edger having certain adjustable features by which it can be readily adapted for other uses.

The principal object of the invention resides in the provision of a lawn edger of light and flexible construction, having a rotary cutting element and guide therefor which can be adjusted to either vertical or horizontal cutting positions, for trimming grass along curbs and sidewalks, or adjacent to walls, building foundations, and the like.

Another object of the invention is that of providing a grass trimmer in which the frame can be adjusted vertically to control the depth of cut of the rotary cutting element either in ordinary trimming operations or for cutting away sodded grass in preparing flower and shrub beds, or when it is desirable to remove the sod for other purposes, as around trees, and the like.

Broadly, the invention contemplates the provision of a grass trimmer and edger having the general characteristics and features for that described in Letters Patent No. 3,019,585, dated February 6, 1962, but operative independently of a lawn mower, and possessing features of construction lending substantial flexibility in operation, and simplicity and economy in design.

While the foregoing objects are paramount, other and lesser objects will become apparent as the description proceeds, when considered in connection with the appended drawings wherein.

Figure 1:
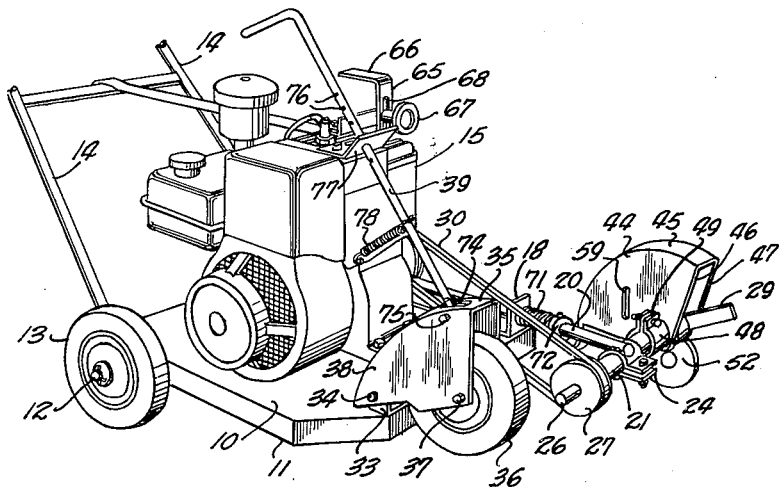
FIGURE 1 is a perspective illustration of the invention showing the invention in operative position.

Accordingly, the invention comprises a base member 10 having a peripheral depending flange 11 transversely of which, adjacent to its rearmost edge, is arranged an axle shaft 12 which extends outwardly beyond the side flanges 11 providing spindles for a pair of rear wheels 13. A pair of handle members 14 are attached, at their lowermost ends, to the shaft 12 between the wheels 13 and the side flanges 11 of the base 10. A motor 15, such as a gasoline engine, is supported on the base 10 and secured thereto by bolts 16.

Figure 3:
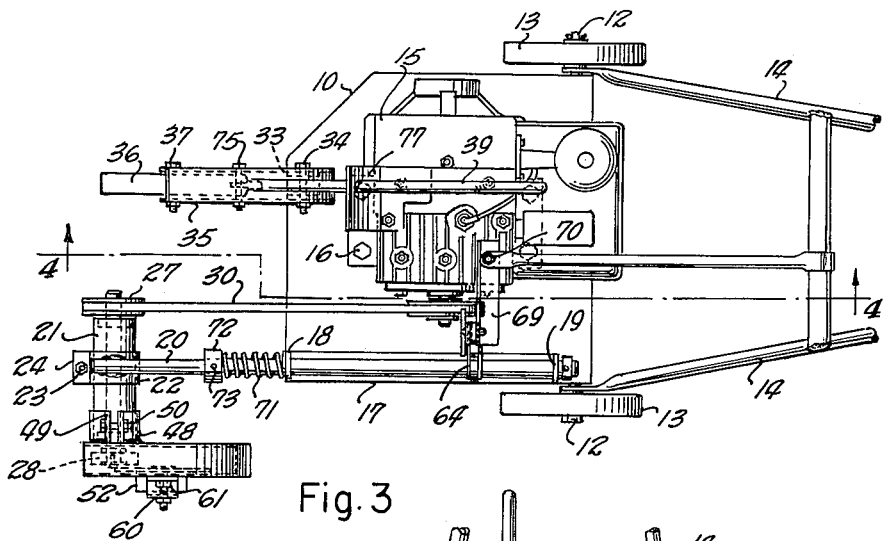
FIGURE 3 is a plan view of the invention showing the cutting element arm and the vertically adjustable front wheel.
Figure 5:
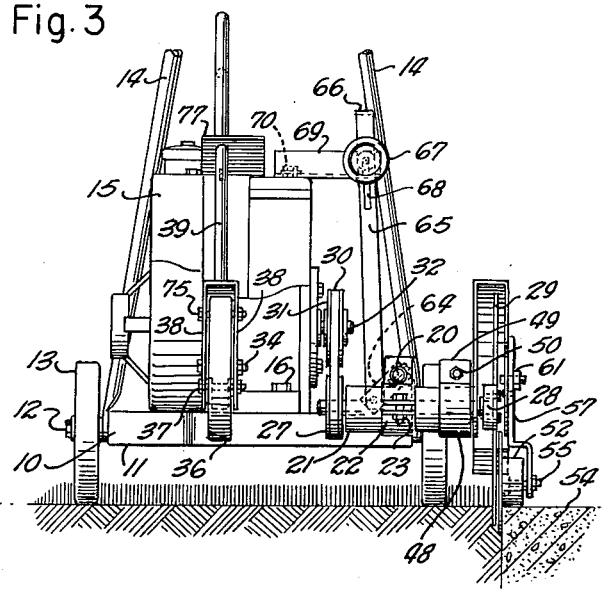
FIGURE 5 is a front elevational view of the invention in operative position along a curb or sidewalk, the latter being shown in fragmentary section with the adjacent turf, and showing the front wheel in raised position.

Arranged along the left-hand side of the base 10 is a bracket 17 comprising a bar or strap having its opposing ends bent upwardly at right-angles to provide journal supports 18 and 19 for a shaft 20 which extends forwardly of the front support 18 and has a bearing sleeve 21 attached to its outermost end and transversely thereof, as best illustrated in FIGURES 1, 3 and 5. The bracket 17 may be secured to the base 10 in any suitable manner.

The outer end of the shaft 20 is welded or otherwise secured to a collar 22 which embraces the bearing sleeve 21 and secured by a bolt 23 arranged through matching ears 24 of the collar 22 whereby the sleeve 21 is easily removed when desirable to do so. Seated in each end of the sleeve 21 is a non-friction bearing 25, as shown best in FIGURES 9 and 10, in which the ends of a shaft 26 are journalled. The inner end of the shaft 26 has a V-pulley 27 attached thereto while the hub member 28 of a rotary cutting blade 29 is threaded on its outer end. A V-belt 30 is arranged about the V-pulley 27 and a V-pulley 31 on the drive shaft 32 of the engine 15 whereby the shaft 26 is rotated in either vertical or horizontal planes, as will presently become apparent.

Forwardly of the base 10, and slightly right of the longitudinal axis thereof, is a U-shaped bracket 33 to which is pivotally attached, by a bolt 34, the fender or guard 35 of a wheel 36 which is rotatably mounted on a bolt 37 extending through opposing walls 38 of the guard 35, as illustrated in FIGURES 1, 3, 4 and 5. The top of the guard 35 is arcuate and its depending walls 38 are angular in elevation whereby to substantially enclose the wheel 36 which is adapted to be raised and lowered by a lever 39 in a manner which will presently be described.

Figure 9:
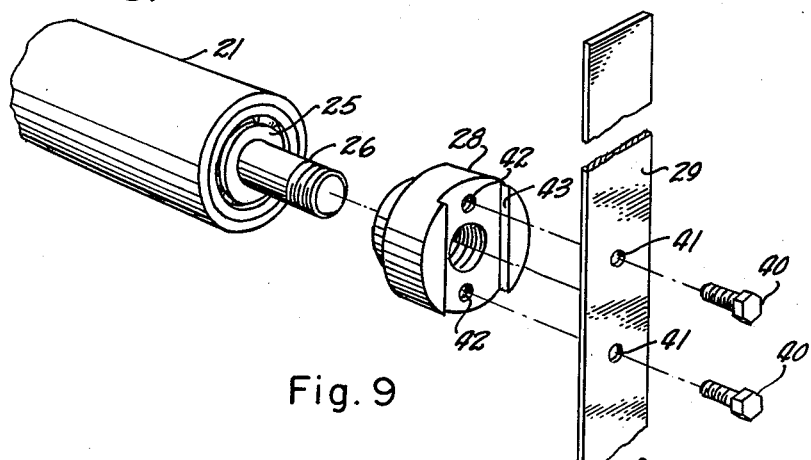
FIGURE 9 is a perspective exploded illustration of the cutting element shaft and bearing sleeve, the hub and blade.
Figure 10:
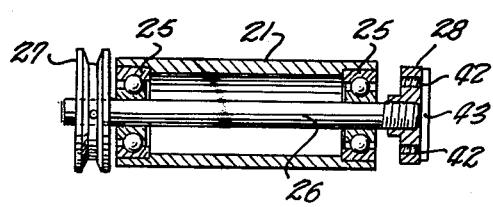
FIGURE 10 is a longitudinal sectional view of the cutting element shaft, bearing sleeve, hub and pulley.

The blade 29, which is shown in detail in FIGURE 9, is secured to the hub 28 by studs 40 arranged through apertures 41 and threaded into tapped bores 42 in the hub 28, the blade 29 being seated in a transverse channel 43 formed in the outer face of the hub 28, as shown in FIGURE 9. A guard 44 is provided to enclose the blade 29, and has an arcuate crown 45 with inner and outer right-angularly parallel walls 46 and 47, as shown in FIGURE 8.

Attached to the inner wall 46 of the guard 44, and concentrically of the arc defined by the crown 45, is a split collar 48 having a pair of opposing lugs 49 formed therewith through which a bolt 50 is arranged whereby to adjustably secure the collar 48 and the guard 44 to the inner end of the bearing sleeve 21, as depicted in FIGURES 3, 5, 6 and 7, while the inner end of the shaft 26 is extended through the inner wall 46 of the guard 44 so that the hub 28 and the blade 29 are enclosed and rotate within the guard 44. The pivotal portion of the outer wall 47 of the guard 44 is diagonal, as indicated by the dotted line 51 in FIGURE 8, to provide access to the studs 40 which secure the blade 29 to the hub 28.

Figures 7, 8:
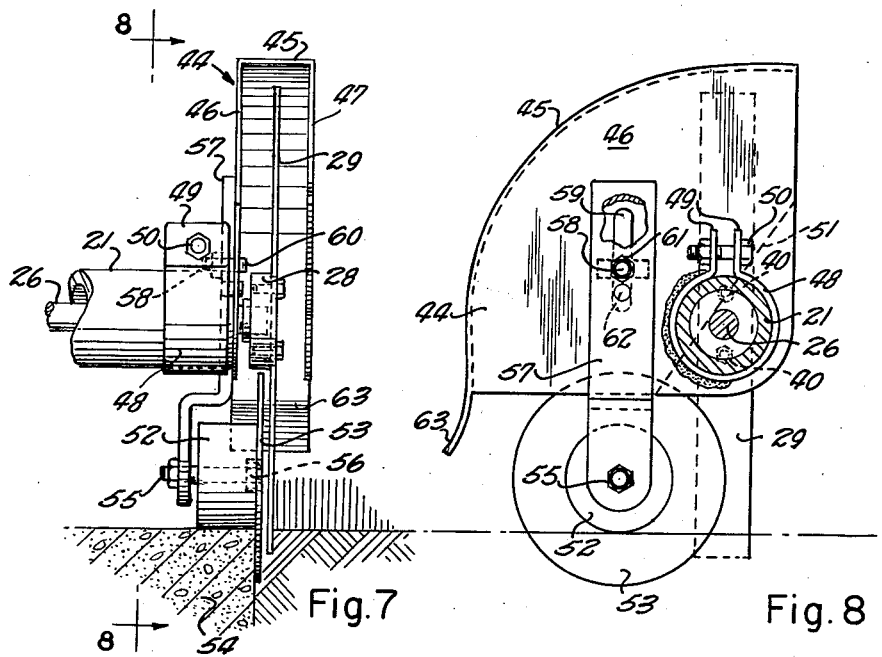
FIGURE 7 is an enlarged front elevational view of the cutting element, with its flanged guide wheel arranged opposite to the position shown in FIGURE 5, the shaft and bearing sleeve being fragmentarily shown.
FIGURE 8 is an elevational view of the cutting element guard and flanged guide wheel, on line 8—8 of FIGURE 7, a portion of the guide wheel bracket being broken away to illustrate the attaching slot in the guard.

When the device is used for trimming along the edge of a walk, or along a curb as shown in FIGURES 5, 7 and 8 the depth of cut of the blade 29 is controlled by a wheel or roller 52 which has a discular flange 53 on one side for engaging the vertical surface of the walk or curb 54 in the wake of the blade 29 and guide the latter. The roller 52 is journalled on a bolt 55 whose head 56 is recessed in its face concentrically of the flange 53 and having its threaded end extending through the outer end of an angular bracket 57 whose inner end is secured by a T-bolt 58 to a wall 46 or 47 of the guard 44, the bolt 58 extending through a vertical slot 59 formed in each wall 46 and 47.

Figure 11:
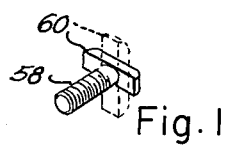
FIGURE 11 is a perspective illustration of the T-bolt for attaching the guide wheel bracket to the cutting element guard.

The T-bolt 58 is shown in perspective in FIGURE 11 and has an elongated head 60 formed transversely of its axis which is capable of being passed through one of the slots 59, in each side wall 46 and 47 of the guard 44, and turned transversely thereof, as apparent in dotted lines in FIGURE 8, whereupon the nut 61 can be tightened to rigidly secure the bracket 57 in adjusted positions. A pin 62 is attached to the engaging face of the bracket 57, near the aperture provided therein for the bolt 58, which is extended into the slot 59 to prevent rotation of the bracket 57 when properly secured, as shown in FIGURES 7 and 8.

It is apparent, by reference to FIGURES 5 and 7, that the bracket 57, with the roller 52, may be attached to either side of the guard 44 for right or left-hand application to the curb or walk 54 by removing the head 60 of the bolt 58 from one slot 59 and applying it to the other. The bracket 57 can be adjusted up and down by loosening the nut 61 and retightening the same. The guard 44 is capable of rotative adjustment about the sleeve 21 by releasing the collar 48. A baffle 63 is provided at the rear of the guard 44 by extending the crown 45 thereof beyond the lower edges of the walls 46 and 47, as shown in FIGURES 7 and 8.

The cutter assembly, which includes the sleeve 21, the shaft 26, the blade 29 and the guard 44, is adjusted to horizontal and vertical positions by the rotation of the shaft 20. An arm 64 is rigidly attached at one end to the shaft 20, and is pivoted at its opposite end to the lowermost end of a vertical lever 65 which is adjustable longitudinally to move the arm 64 in a 90 degree arc and rotate the shaft 20 to either position shown in FIGURES 5 and 6.

The upper end of the lever 65 has a right-angular portion 66 providing a convenient handle by which it can be raised and lowered when the knobbed screw 67 is loosened, the latter being arranged through a slot 68 formed longitudinally of the lever 65 near its upper end, and threaded into the outer end of a horizontal bracket 69 secured at its inner end to one of the studs 70 in the head of the motor 15, as shown in FIGURES 1, 2, 3, 5 and 6.

Figure 2:
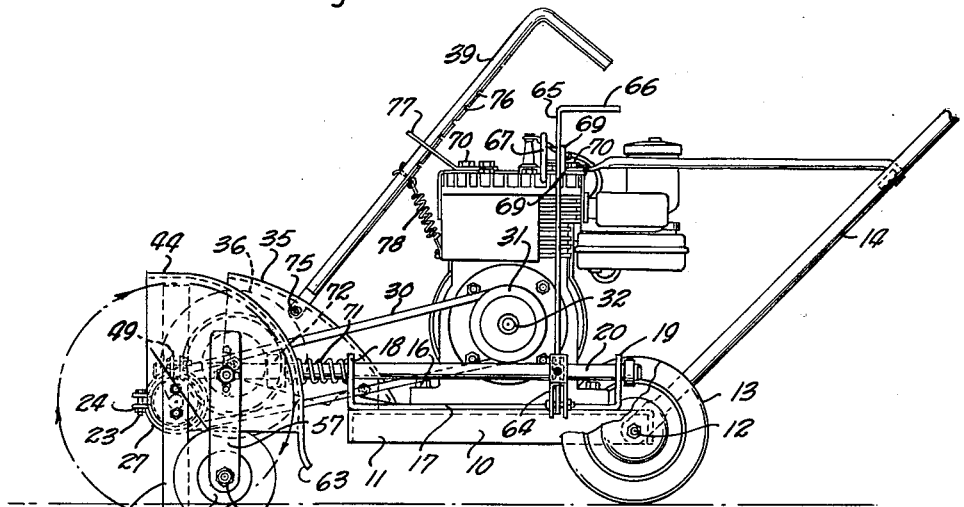
FIGURE 2 is a side elevational view of the invention showing the left rear wheel partially broken away, and illustrating, in broken and dotted lines, the direction of rotation of the cutting element and the elevated front wheel.
Figure 4:
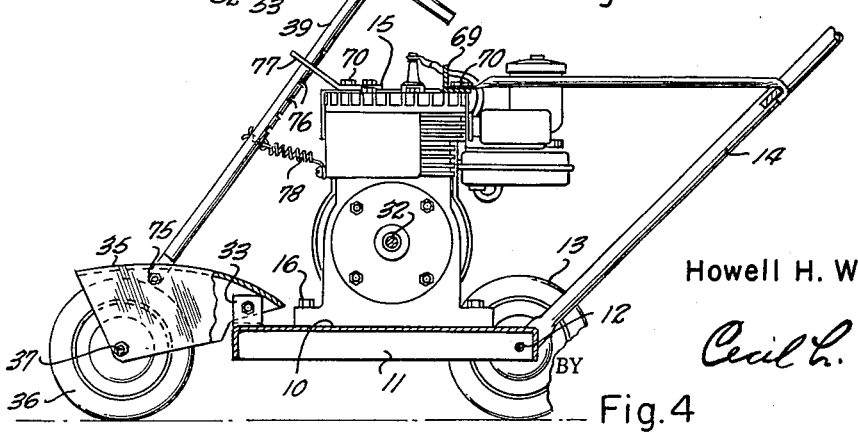
FIGURE 4 is a longitudinal sectional view, on line 4—4 of FIGURE 3, showing a portion of the front wheel guard broken away.

The shaft 20, being capable of 90 degree rotation by the operation of the lever 65, is biased longitudinally by a compression spring 71 embracing the same and bearing rearwardly against the bearing support 18 and forwardly against a collar 72 secured by a set screw 73 on the shaft 20, as shown particularly in FIGURES 1, 2 and 3. The tension of the spring 71 will aid in retaining the cutter assembly in adjusted positions.

Figure 6:
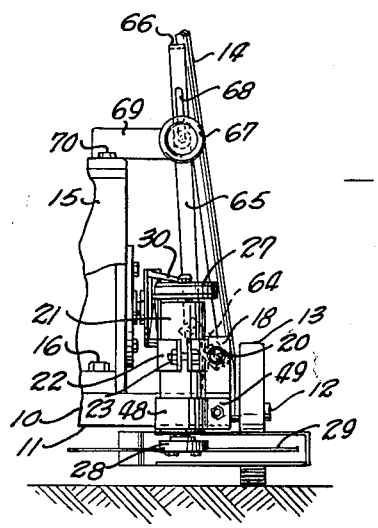
FIGURE 6 is a fragmentary front elevational view of the cutting element and guard in horizontal position.

The wheel 36 is provided primarily for portability of the device but is useful in predetermining the height of the cutter assembly when adjusted to the horizontal position shown in FIGURE 6 and thus control the planes in which the blade 29 is to be operated. The lever 39 is arranged at a suitable angle, as best illustrated in FIGURE 2, by which it can be conveniently manipulated by the operator. The lower end of the lever 39 is extended through a slot 74 in the top of the guard 35 and is pivotally secured thereto by a bolt 75 arranged through the walls of the guard 35, as shown in FIGURES 1 and 2.

The wheel 36 can be adjusted to different elevated positions through the medium of a series of notches 76 formed along a portion of the underside of the lever 39 which are engageable with the bottom of an aperture in a bracket 77 fixed to the top of the engine 15 by one of the studs 70 in the head thereof, as shown in FIGURES 1 and 2. A pull spring 78 is attached to the lever 39 at one end and to the engine 15 at its opposite end whereby to bias the lever 39 to its adjusted positions.

It is not intended that the invention be specifically limited to the structure and design herein shown and described since certain modifications therein may be resorted to without departing from the spirit and intent thereof or the scope of the appended claim.

What is claimed is:

In a power driven lawn trimmer and edger having a wheeled base and a motor on said base having a driven pulley, a rotary cutter assembly, a first shaft rotatably supported along and parallel to one side of said base and a bearing sleeve secured to the forward end of said shaft and transversely thereof, the improvements comprising, in combination, a second shaft journalled in said sleeve and having a cutter blade attached to one end, a V-pulley on the opposite end of said second shaft and a V-belt connecting said pulley with the pulley on said motor, a guard having spaced parallel walls providing a housing for said cutter blade and capable of rotative adjustment on said sleeve, an angular bracket detachably secured to one wall of said guard and capable of being secured to the opposite wall thereof, the said bracket being vertically adjustable and having a bolt on its free end, and a flanged guide roller mounted on said bolt for controlling the depth of cut of said blade, means for partially rotating said first shaft whereby to change the plane of rotation of said blade, a vertically adjustable porting wheel mounted for supporting said blade and said roller in inoperative position, an arcuate fender guard on said porting wheel, on the front of said frame and a lever attached at one end to said fender guard for raising said porting wheel to fixed adjusted position whereby said cutter blade is supported at adjusted cutting depths by said guide roller.

References Cited by the Examiner

UNITED STATES PATENTS

| | | | |
|---|---|---|---|
| 2,787,107 | 4/57 | Strasel | 56—25.4 |
| 2,791,875 | 5/57 | Faas | 56—25.4 |
| 3,019,585 | 2/62 | Wellborn | 56—256 X |

T. GRAHAM CRAVER, *Primary Examiner.*

ANTONIO F. GUIDA, ARNOLD RUEGG, *Examiners.*